United States Patent
Puradbhat et al.

(10) Patent No.: US 12,413,088 B2
(45) Date of Patent: Sep. 9, 2025

(54) CONTROL OF POWER RESOURCES BASED ON BATTERY STATE OF HEALTH AND OPERATION METRICS

(71) Applicant: Eaton Intelligent Power Limited, Dublin (IE)

(72) Inventors: Sumedh Shashikant Puradbhat, Pune (IN); Pranavamoorthy Balasubramanian, Chennai (IN); Hossein Ghassempour Aghamolki, Edina, MN (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 854 days.

(21) Appl. No.: 17/683,015

(22) Filed: Feb. 28, 2022

(65) Prior Publication Data
US 2023/0275446 A1    Aug. 31, 2023

(51) Int. Cl.
*H02J 7/00* (2006.01)

(52) U.S. Cl.
CPC ...... *H02J 7/00712* (2020.01); *H02J 7/00032* (2020.01); *H02J 7/0048* (2020.01); *H02J 7/005* (2020.01)

(58) Field of Classification Search
CPC .. H02J 7/00712; H02J 7/00032; H02J 7/0048; H02J 7/005
See application file for complete search history.

(56) References Cited

U.S. PATENT DOCUMENTS

| | | |
|---|---|---|
| 8,332,342 B1 | 12/2012 | Saha et al. |
| 2011/0060538 A1 | 3/2011 | Fahimi et al. |
| 2013/0141109 A1 | 6/2013 | Love et al. |
| 2014/0005852 A1* | 1/2014 | Asghari .............. H02J 3/32 700/297 |

(Continued)

FOREIGN PATENT DOCUMENTS

CN    111273186 A  *  6/2020  ......... G01R 31/3644

OTHER PUBLICATIONS

Machine translation of CN111273186A. (Year: 2020).*

(Continued)

*Primary Examiner* — Drew A Dunn
*Assistant Examiner* — Pamela J Jeppson
(74) *Attorney, Agent, or Firm* — Talem IP Law, LLP

(57) ABSTRACT

Control of power resources based on battery state of health (SoH) and operation metrics includes estimating a SoH of a particular battery using an end-of-life SOH value and a kWh warranty value from battery catalog data and a battery kWh from battery throughput data; estimating battery capacity using the estimated SoH and a rated battery capacity from the battery catalog data; and estimating an allowable monthly throughput using a month warranty value, the kWh warranty value, the battery kWh, and number of operating months. Dynamic discharge cost is calculated using battery replacement cost data, the kWh warranty value, and the battery kWh. An optimal dispatch for operating the particular battery can be determined considering battery degradation using the estimated battery capacity, the estimated (Continued)

allowable monthly throughput, and the dynamic discharge cost. Dispatch commands can be output according to the determined optimal dispatch.

20 Claims, 7 Drawing Sheets

(56) References Cited

U.S. PATENT DOCUMENTS

| | | | |
|---|---|---|---|
| 2014/0088898 A1 | 3/2014 | Lim | |
| 2014/0139191 A1* | 5/2014 | Asghari | H01M 10/48 |
| | | | 320/134 |
| 2019/0113577 A1 | 4/2019 | Severson et al. | |
| 2019/0140465 A1* | 5/2019 | Hooshmand | H02J 7/0069 |

OTHER PUBLICATIONS

Chengquan Ju et al. "A Two-Layer Energy Management System for Microgrids with Hybrid Energy Storage Considering Degradation Costs" IEEE Transactions on Smart Grid, May 10, 2017, 11 pages, vol. 9, No. 6.

Jianfang Xiao et al. "Multi-Level Energy Management System for Real-Time Scheduling of DC Microgrids With Multiple Slack Terminals" IEEE Transactions on Energy Conversion, Oct. 25, 2015, 9 pages, vol. 31, No. 1.

Jonghoon Kim et al. "State-of-Change Estimation and State-of-Health Prediction of a Li-Ion Degraded Battery Based on an EKF Combined With a Per-Unit System" IEEE Transactions on Vehicular Technology, Sep. 22, 2011, 12 pages, vol. 60, No. 9.

Kandler Smith et al. "Life Prediction Model for Grid-Connected Li-ion Battery Energy Storage System" 2017 American Control Conference, May 24-26, 2017, 7 pages.

Bo Zhao et al. "Robust Optimal Dispatch of AC/DC Hybrid Microgrids Considering Generation and Load Uncertainties and Energy Storage Loss" IEEE Transactions on Power Systems, May 17, 2018, vol. 33, Issue: 6.

* cited by examiner

CONTROL OF POWER RESOURCES BASED ON BATTERY STATE OF HEALTH AND OPERATION METRICS

BACKGROUND

Optimal operation control of a battery needs accurate estimate of its capacity. The battery capacity can vary due to the battery operation and variations in real-time conditions and environmental factors. Based on these and other factors, planned system control may need to be altered to account for the variation in battery capacity. The state of health estimation of a battery is an important factor in optimizing operation control of the battery.

Current methods of determining state of health of a battery often involve significant effort to characterize a battery having specific chemistry and manufacturer prior to deploying a battery of that type at a site along with access to physical parameters, such as voltage, current, and temperature, of the battery during operation. However, these methods estimating the state of health of a battery are challenging to use in optimal control algorithms. Thus, there is a need of a method of estimating state of health of a battery and operation control metrics that is generic, uses readily available field measurements, and is computationally light.

BRIEF SUMMARY

Control of power resources based on battery state of health and operation metrics is provided that is applicable across different battery chemistries and uses readily available field measured data.

A method of control of power resources based on battery state of health (SoH) and operation metrics includes estimating a SoH of a particular battery using an end-of-life SoH value and a kWh warranty value from battery catalog data and a battery kWh throughput from battery throughput data; estimating battery capacity using the estimated SoH and a rated battery capacity from the battery catalog data; and estimating an allowable monthly throughput using a month warranty value, the kWh warranty value, the battery kWh throughput, and number of operating months. Dynamic discharge cost is calculated using battery replacement cost data and the kWh warranty value from the catalog data and the battery kWh throughput from the battery throughput data. An optimal dispatch for operating the particular battery can be determined considering battery degradation using the estimated battery capacity, the estimated allowable monthly throughput, and the dynamic discharge cost. Dispatch commands can be output according to the determined optimal dispatch.

The described method can be carried out by a power resource controller that includes or communicates with storage resources storing the battery catalog data and a battery memory storage that stores battery throughput data. No complicated testing of a battery is required. The power resource controller can calculate battery metrics by linear methods using easily accessible data at the storage resources and can use the battery metrics for dispatch and logic control.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Control of power resources based on battery state of health and operation metrics is provided that is applicable across different battery chemistries and uses readily available field measured data.

A computationally light and linearized method for estimating battery state of health and battery control metrics is described. The method is applicable across the different battery chemistries and uses readily available field measured data. Advantageously, the estimations of battery state of health generated by the described method is suitable for operation control. In addition, it is possible to consider battery warranty conditions in operation controls to extract a maximum economic benefit throughout the battery life. The described methods are suitable for any hybrid power scenario such as hybrid vehicles and microgrids with distributed energy resources.

The described method uses battery energy throughput data and catalog warranty information to generate state of health and metrics for operation control. The described method and metrics are generic enough to be used for different batteries without the need for deriving experimental models. Indeed, the described method is applicable across battery types, chemistries, and manufacturers; uses readily measurable data; and can provide rough estimate of battery state of health in case an energy storage system is operational but no parameter data is recorded.

Figure 1:
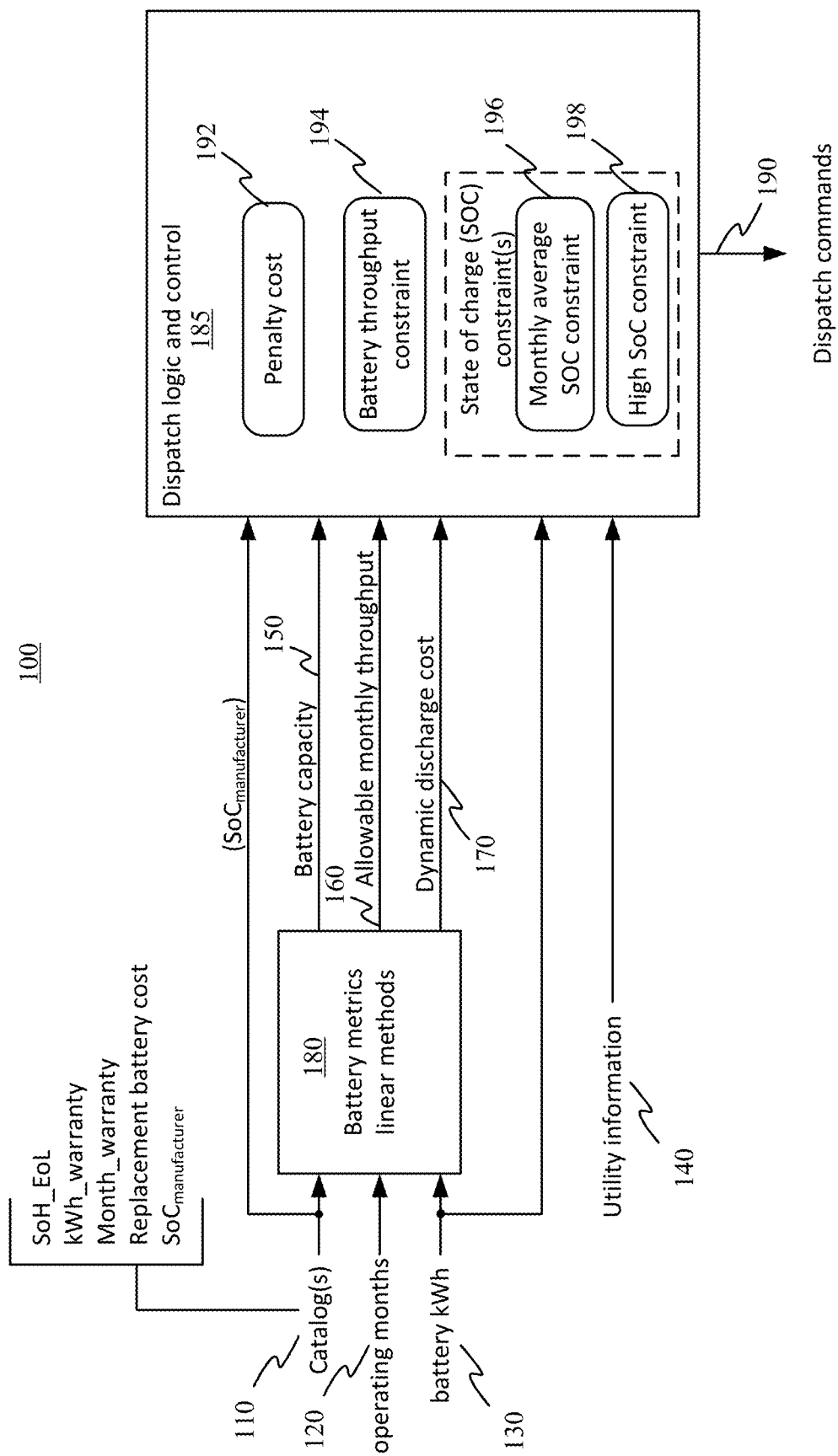
FIG. 1 illustrates a schematic diagram of control of power resources based on battery state of health and operation metrics.

FIG. 1 illustrates a schematic diagram of control of power resources based on battery state of health and operation. Referring to FIG. 1, a system 100 providing control of power resources based on battery state of health and operation metrics receives catalog information 110 of the one or more batteries operated under control of the system 100. The catalog information 110 includes the State of Health at End of Life (SoH_EoL), total kWh usage under warranty (kWh_warranty), total number of months under warranty (Month_warranty), rated capacity and the average State of Charge specified by the battery manufacturer ($SoC_{manufacturer}$), and Replacement battery cost. This catalog information can be obtained from the manufacturer and/or seller/distributor and may be stored locally by system 100 or readily available over a network.

System 100 also regularly (e.g., at certain time intervals) receives information on number of months that a battery has been in operation ("operating months" 120), the cumulative and/or monthly battery kWh throughput ("battery kWh" 130), and, for power grid implementations, utility information 140. System 100 uses catalog information 110, operating months 120, and battery kWh 130 to generate information of battery capacity 150, allowable monthly throughput 160, and dynamic discharge cost 170 by performing battery metrics linear methods 180.

It is desirable to provide optimal dispatch considering battery degradation.

Accordingly, system 100 includes dispatch logic and control 185 that receives catalog information 110 (e.g., $SoC_{manufacturer}$), battery capacity 150, allowable monthly throughput 160, dynamic discharge cost 170, and the utility information 140 (among other information). The dispatch logic and control 185 uses the received information of $SoC_{manufacturer}$, battery capacity 150, allowable monthly throughput 160, and dynamic discharge cost 170 to apply constraints for dispatch commands 190. The constraints can include penalty cost 192, a battery throughput constraint 194, and one or more state of charge (SOC) constraints. The one or more SOC constraints can include a monthly average state of charge constraint 196 and/or a high state of charge operation constraint 198.

Figure 3A:
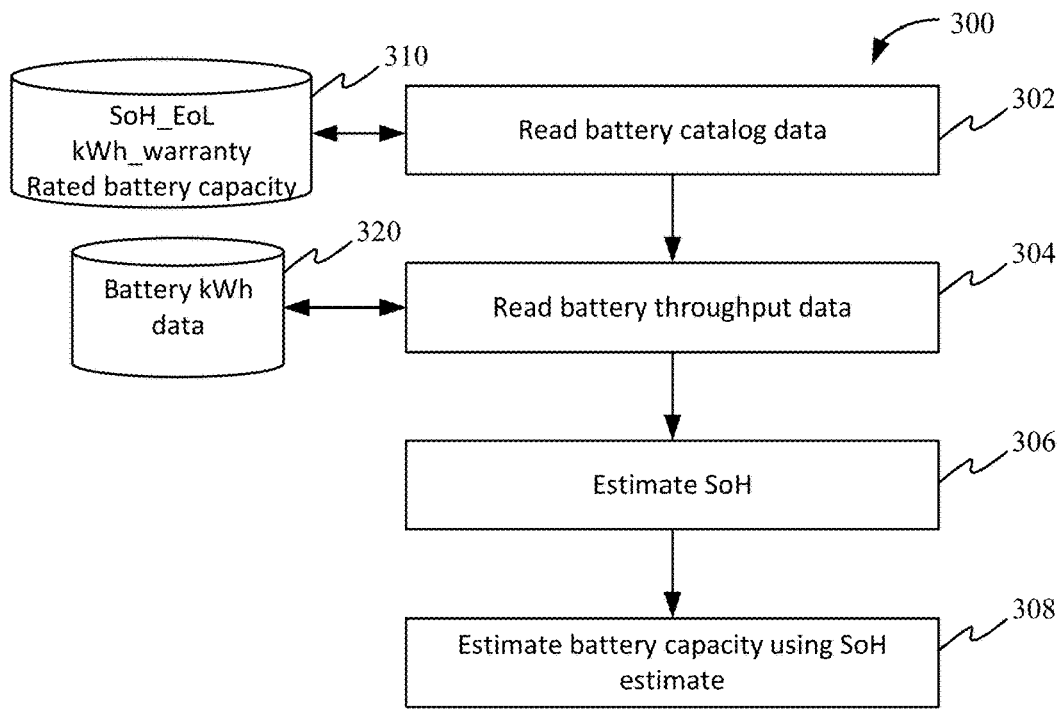
FIGS. 3A and 3B illustrate process flows corresponding to certain battery metrics linear methods used in control of power resources.
Figure 3B:
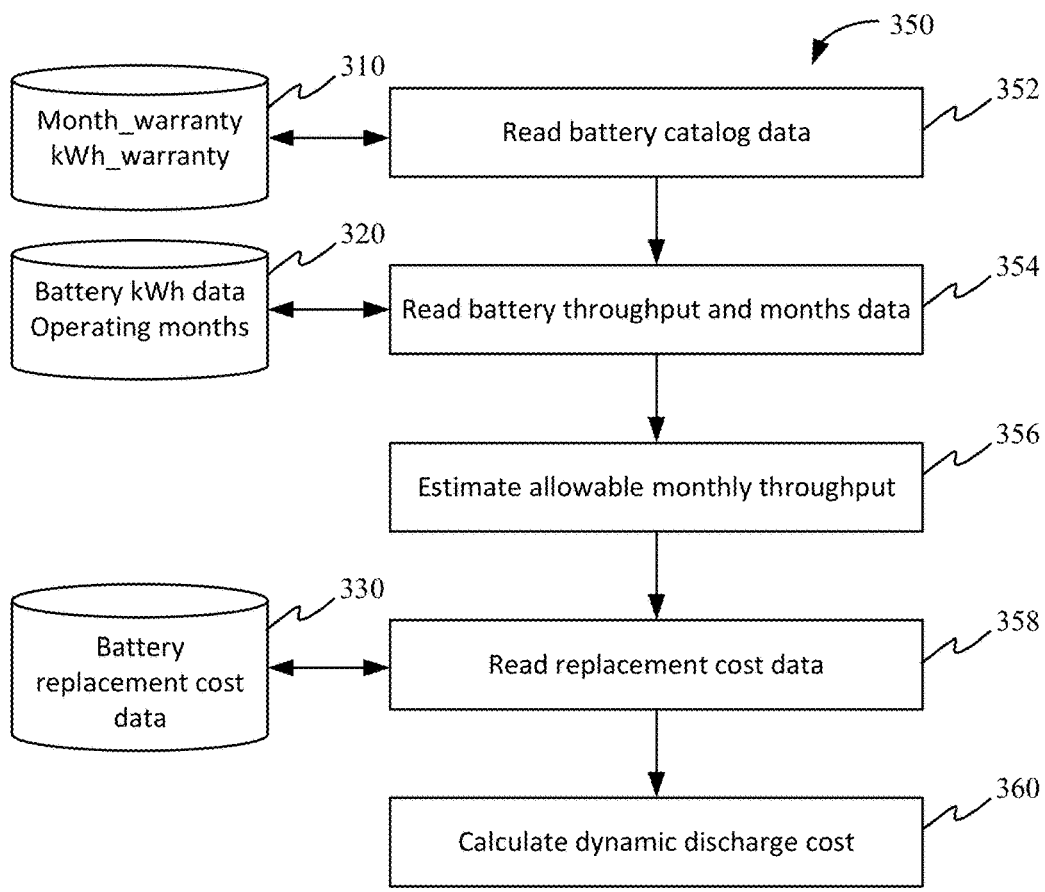
Figure 4A:
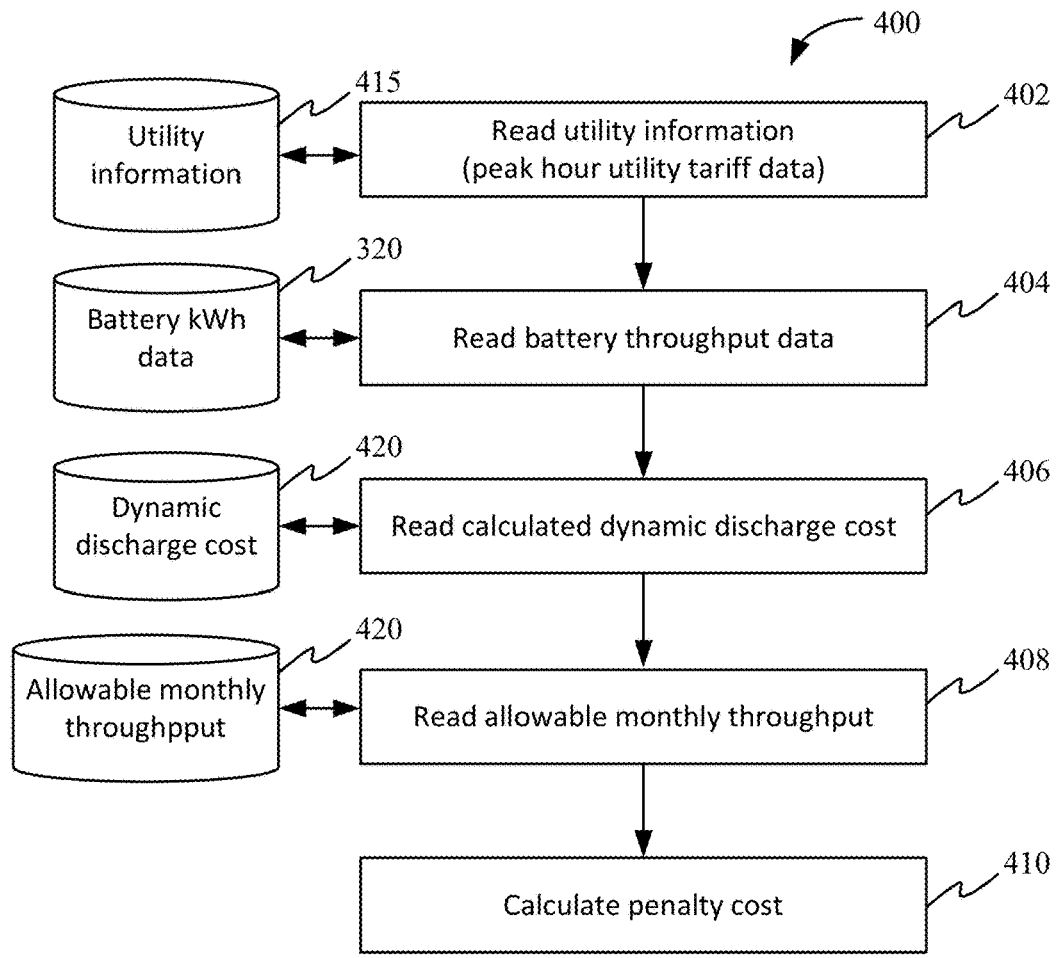
FIGS. 4A-4D illustrate process flows corresponding to throughput and state of charge determinations for control of power resources.
Figure 4B:
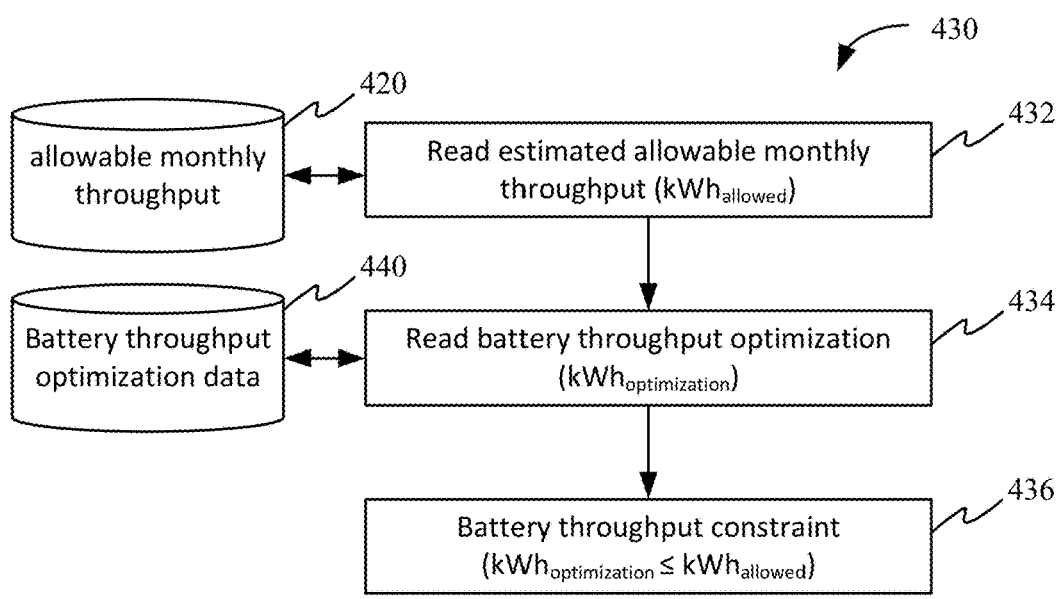
Figure 4C:
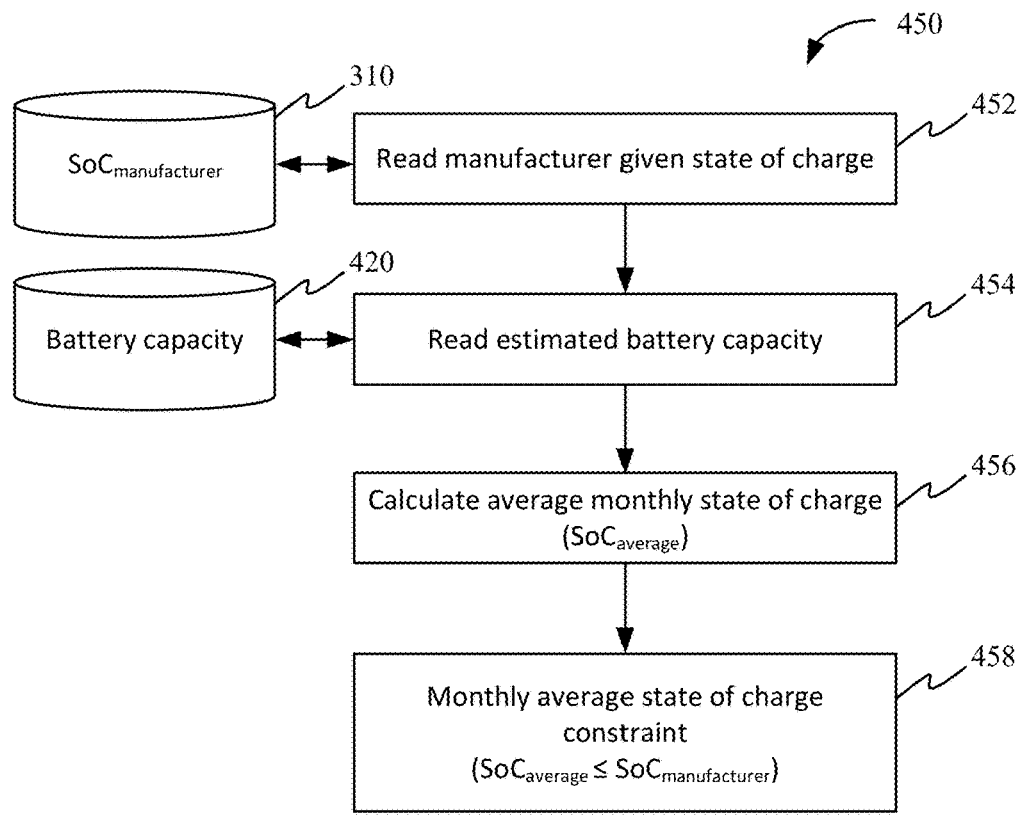
Figure 4D:
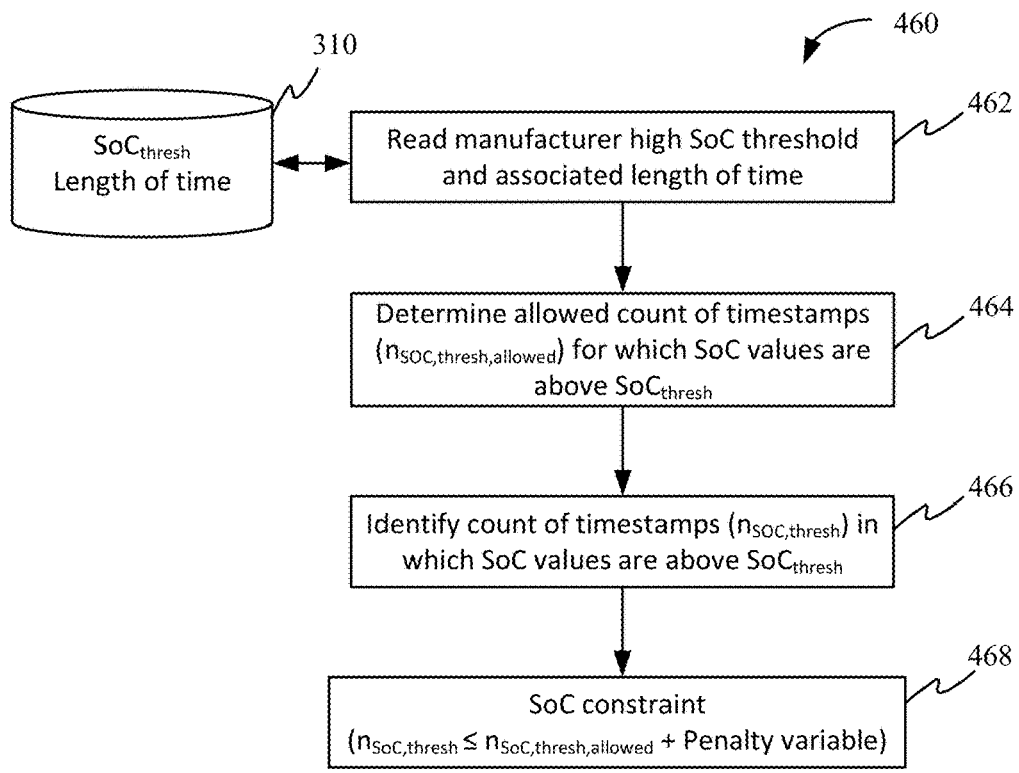
Figure 5:
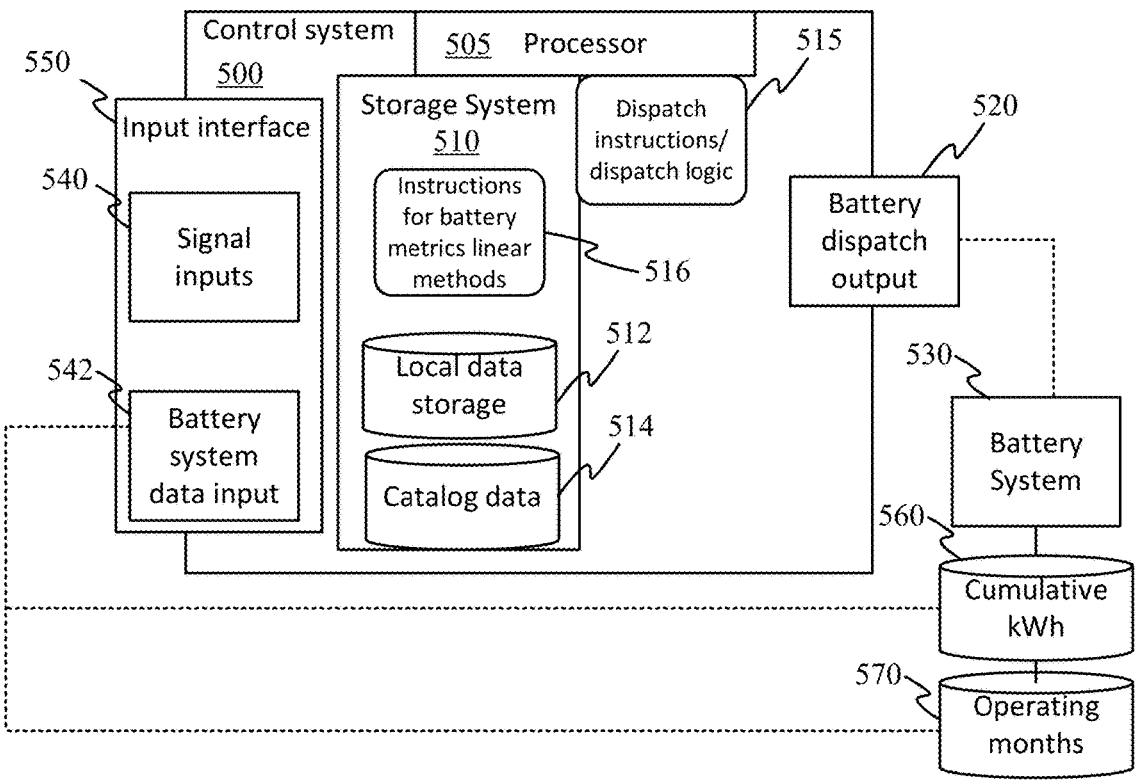
FIG. 5 illustrates a representation of a power resource control system incorporating battery state of health and operation metrics.
Figure 6:
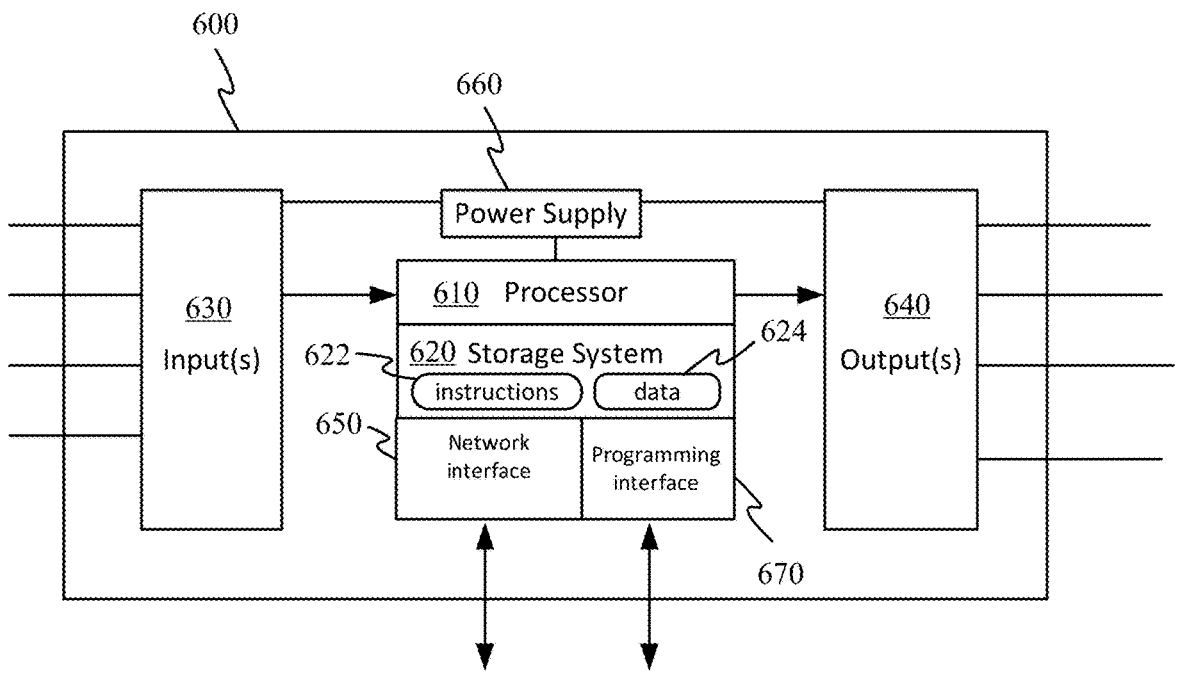
FIG. 6 illustrates a schematic representation of a site-level controller incorporating battery state of health and operation metrics.

System 100 can be embodied as described with respect to FIG. 5 or 6 and perform processes such as described with respect to FIGS. 2, 3A, 3B, and 4A-4D.

Figure 2:
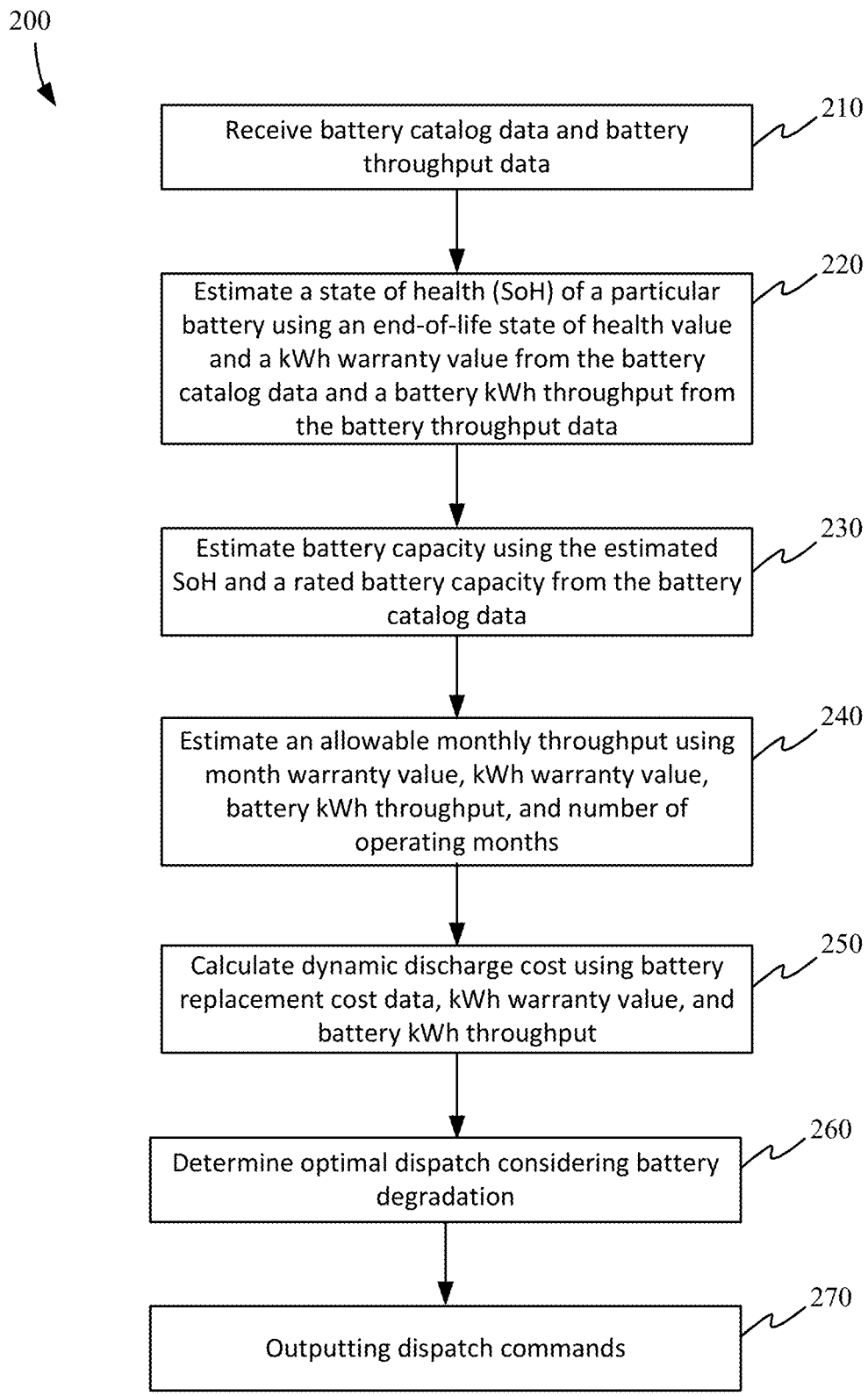
FIG. 2 illustrates a process flow for control of power resources based on battery state of health and operation metrics.

FIG. 2 illustrates a process flow for control of power resources based on battery state of health and operation. Referring to FIG. 2, one or more controllers (e.g., power resource control system 500 of FIG. 5 or site-level controller 600 of FIG. 6), for example, following the schematic diagram of system 100 of FIG. 1, can perform a process 200 including receiving (210) battery catalog data and battery throughput data; estimating (220) a state of health (SoH) of a particular battery using an end-of-life state of health value and a kWh warranty value obtained from the battery catalog data and a battery kWh throughput obtained from the battery throughput data; estimating (230) battery capacity at a using the estimated SoH and a rated battery capacity received from the battery catalog data; estimating (240) an allowable monthly throughput using a month warranty value and the kWh warranty value obtained from the battery catalog data and the battery kWh throughput and number of operating months obtained from the battery throughput data; and calculating (250) dynamic discharge cost using battery replacement cost data and the kWh warranty value obtained from the battery catalog data and the battery kWh throughput obtained from the battery throughput data. The SoH and the battery capacity can be estimated as described with respect to process flow 300 of FIG. 3A. The estimated allowable monthly throughput and dynamic discharge cost can be estimated as described with respect to process flow 350 of FIG. 3B.

Process 200 further includes determining (260) an optimal dispatch for operating the particular battery considering battery degradation using the estimated battery capacity, the estimated allowable monthly throughput, and the dynamic discharge cost; and outputting (270) dispatch commands according to the determined optimal dispatch. The determining of the optimal dispatch considering battery degradation can include calculating a penalty cost, applying a battery throughput constraint, and applying one or more state of charge constraints such as described with respect to process 400 of FIG. 4A, process 430 of FIG. 4B, process 450 of FIG. 4C, and process 460 of FIG. 4D.

FIGS. 3A and 3B illustrate process flows corresponding to certain battery metrics linear methods used in control of power resources. Referring to FIG. 3A, a process flow 300 includes obtaining (e.g., by reading) (302) battery catalog data, including SoH_EoL (manufacturer defined end of life state of health) and kWh_warranty (the manufacturer warrantied energy throughput of the battery) from a battery catalog data resource 310; obtaining (e.g., by reading) (304) battery throughput data, including battery kWh throughput (the cumulative sum of energy withdrawn from the battery until the point of calculation of SoH, given as $kWh_{cumulative}$) from a memory storage resource 320 associated with the battery; and estimating (306) SoH using the SoH_EoL, kWh_warranty, and $kWh_{cumulative}$ values as follows:

$$SoH = \left(1 - \frac{SoH_{EoL} \times kWh_{cumulative}}{kWh_{warranty}}\right).$$

Battery capacity ("Storage capacity" also referred to as "storage_max_cap") can then be estimated (308) using the estimated SoH and rated battery capacity read from the battery catalog data as follows:

storage_max_cap=SoH×Rated battery capacity(kWh).

The allowable monthly battery throughput and dynamic discharge cost metrics to control battery operation so that the battery lasts the warrantied calendar life can be calculated at a monthly interval following process flow 350 as shown in FIG. 3B. For example, one may want to operate an energy storage system within boundaries of manufacturer warranty conditions to avoid excessive degradation and warranty termination. An illustrative warranty termination condition includes 120 months after installation if operated at rated temperature or after 313,000 Ah throughput of the battery $$\left(kWh_{warranty} = \frac{(V_{battery,nominal} \times Ah_{lifetime})}{1000}\right);$$

another illustrative set of warranty termination conditions include operation of more than 2 cycles per day and 10 years when average annual SoC does not exceed 50%. The described processes take into account warranty termination conditions when taking into account battery degradation.

Referring to FIG. 3B, process flow 350 includes obtaining (e.g., by reading) (352) battery catalog data, including the manufacturer rated calendar life of the battery (Month_warranty) and kWh_warranty (the manufacturer warrantied energy throughput of the battery) from the battery catalog data resource 310; obtaining (e.g., by reading) (354) battery throughput data, including cumulative battery kWh throughput (the cumulative sum of energy withdrawn from the battery until the point of calculation of SoH, given as $kWh_{cumulative}$) and the total number of months since battery commissioning—the operating months, given as $Month_{cumulative}$) from the memory storage resource 320; and estimating (356) allowable monthly throughput as follows:

$$kWh_{allowed} = \frac{(kWh_{warranty} - kWh_{cumulative})}{(Month_{warranty} - Month_{cumulative})}.$$

The allowable monthly throughput (kWh$_{allowed}$) is stored for use in further calculations.

Next, process 350 further includes obtaining (e.g., by reading) (358) battery replacement cost data (e.g., from catalog 330) and calculating (360) dynamic discharge cost using the obtained cumulative battery kWh throughput (e.g., read in operation 354) and the obtained battery replacement cost data ("battery replacement capital cost") as follows:

$$\text{dynamic discharge cost} = \frac{\text{battery replacement capital cost}}{(kWh_{warranty} - kWh_{cumulative})}.$$

The battery catalog data resource 310 and catalog 330 may be from the same catalog storage resource or different catalog storage resources. In addition, each of the battery catalog data resource 310, memory storage resource 320, and catalog 330 can themselves include various separate storage resources.

FIGS. 4A-4D illustrate process flows corresponding to throughput and state of charge determinations for control of power resources. Referring to FIG. 4A, a process 400 for calculating penalty cost includes obtaining (e.g., by reading) (402) utility information (e.g., peak hour utility tariff data, utility charge$_{peak}$) from a utility information resource 415; obtaining (e.g., by reading) (404) battery throughput data (e.g., cumulative kWh throughput for a particular month and timestamp) from the memory storage resource 320 associated with the battery; obtaining (e.g., by reading) (406) the dynamic discharge cost calculated in operation 360 described with respect to FIG. 3B (e.g., which may be stored at a local storage 420); reading the allowable monthly throughput (for the particular month) calculated in operation 356 described with respect to FIG. 3B (e.g., which may be stored at a local storage 420); and calculating (408) penalty cost as follows:

$$\text{Penalty cost}_t\left(\frac{\$}{kWh}\right) = $$

$$(\text{utility charge}_{peak} - \text{dynamic discharge cost}) \times \frac{kWh_{cumulative,month,t}}{kWh_{allowed,month}}.$$

In addition to penalty cost, other constraints are applied to dispatch commands. For example, referring to FIG. 4B, process 430 is performed for a battery throughput constraint by obtaining (e.g., by reading) (432) the allowable monthly throughput calculated in operation 356 described with respect to FIG. 3B (e.g., which may be stored at a local storage 420); obtaining (e.g., by reading) (434) a battery throughput optimization value available from an optimization or control strategy model used by the system (which may be received from a main optimization process and temporarily stored at a local storage 440 which may be the same or a different storage than local storage 420); and applying (436) a battery throughput constraint on the battery throughput optimization value as follows:

$$kWh_{optimization} \leq kWh_{allowed}$$

The battery throughput optimization value can be calculated as follows.

$$kWh_{optimization} = \Sigma_{over\ timestamps\ t\ in\ a\ month}(\text{storage\_discharge}_t \times 1/\text{granularity}),$$

where the storage discharge$_t$ value is captured at regular intervals (e.g., t=timestamps of every 5-15 minutes) and can be summed over a month.

Referring to FIG. 4C, process 450 can be performed for a monthly average state of charge constraint. The average state of charge constraint can be used to avoid exceeding a manufacturer's given state of charge value, on average, over a month (or other designated amount of time). Here, process 450 can include obtaining (e.g., by reading) (452) a manufacturer given state of charge (e.g., from the battery catalog data resource 310); obtaining (e.g., by reading) (454) the estimated battery capacity calculated in operation 308 described with respect to FIG. 3A (e.g., which may be stored at local storage 420); calculating (456) the monthly average state of charge; and applying (458) a monthly average state of charge constraint as follows:

$$SoC_{average} \leq SoC_{manufacturer}.$$

The monthly average state of charge can be calculated as follows.

$$SoC_{average} = \frac{\Sigma_{over\ timestamps\ t\ in\ a\ month}(SoC_t)}{\text{no. of timestamps in the month}},$$

where the state of charge is determined using the estimated battery capacity at regular intervals (each determination occurring at a timestamp) and summed over a month.

Referring to FIG. 4D, process 460 can be performed for a high state of charge constraint. In addition to, or as an alternative to avoiding exceeding a manufacturer's given state of charge value on average over a month, a constraint can be applied to avoid prolonged high SoC operation of a battery within a period of time in, for example, a month. Process 460 can include obtaining (e.g., by reading) (462) a manufacturer given high state of charge threshold (SoC$_{thresh}$) and associated length of time (at which the SoC is allowed to exceed the SoC$_{thresh}$) from the battery catalog data; determining (464) an allowed count of timestamps (n$_{SoC,thresh,allowed}$) for which a state of charge of the particular battery is allowed to exceed SoC$_{thresh}$ based on the associated length of time; and identifying (466) a count of timestamps (n$_{SoC,thresh}$) in which the state of charge of the particular battery is above SoC$_{thresh}$.

The determining (464) of the allowed count of timestamps can include dividing the associated length of time obtained from the battery catalog data by the amount of time associated with an interval used to check the state of charge (the amount of time between timestamps). The identifying (466) of the count of timestamps in which the state of charge of the particular battery is above SoC$_{thresh}$ can include incrementing a counter (e.g., a device which stores the number of times a particular event or process has occurred) each time a calculated state of charge value is determined to be above SoC$_{thresh}$. The state of charge at a particular timestamp t (SoC$_t$) is calculated at the regular intervals as described above with respect to the process 450 using the estimated battery capacity. Each SoC$_t$ in a desired control horizon (e.g., a variable in a dispatch control model) is compared to the SoC$_{thresh}$ and if the SoC$_t$ is above the SoC$_{thresh}$, then the counter is incremented.

Process 460 can then include applying (468) a high state of charge constraint as follows:

$$n_{SoC,thresh} \leq n_{SoC,thresh,allowed}$$

In some cases, the high state of charge constraint can be applied as follows: n$_{SOC,thresh}$ ≤ n$_{SoC,thresh,allowed}$+Penalty variable, where the penalty variable is a dispatch control model variable that penalizes prolonged high SoC operation of the particular battery.

FIG. 5 illustrates a representation of a power resource control system incorporating battery state of health and operation. The power resource control system 500 is suitable for any multi-energy resource environment, from hybrid vehicles to microgrids. In some cases, aspects of the control system 500 may be integrated together into one or more hardware-logic components. Such hardware-logic components may include FPGAs, program- and application-specific integrated circuits (PASIC/ASICs), program- and application-specific standard products (PSSP/ASSPs), system-on-a-chip (SOC), and complex programmable logic devices (CPLDs), for example. In one implementation, control system 500 is embodied by a programmable logic controller (PLC) such as illustrated in FIG. 6.

Referring to FIG. 5, power resource control system 500 includes a processor 505 and storage system 510, which may include a local data storage 512 and catalog data resource 514.

Processor 505 can be, but is not limited to, a general-purpose central processing unit (CPU), graphics processing unit (GPU), field programmable gate array (FPGA), application specific processors, and logic devices, as well as any other type of processing device, combinations, or variations thereof. Storage system 510 includes any suitable hardware/physical memory.

Dispatch instructions/dispatch logic 515 may be stored on the storage system 510 as instructions, implemented in hardware (e.g., as logic circuitry, FPGA, or ASIC), or a combination thereof. Instructions 516 for battery metrics linear methods are stored on storage system 510 with outputs used by the dispatch instructions/dispatch logic 515. Control system 500 outputs battery dispatch commands via a battery dispatch output interface 520 to a battery system. Control system 500 receives various signal inputs 540 and battery system data input 542 via an input interface 550. Information on cumulative kWh and operating months can be received as part of the battery system data input 542 (and stored at least temporarily at local data storage 512) from the associated data resource(s) (e.g., resources 560, 570) of the battery system 530.

FIG. 6 illustrates a schematic representation of a site-level controller. The site-level controller is suitable for control of distributed energy resources on, for example, a microgrid. Referring to FIG. 6, a site-level controller 600 can include a processor 610; a storage system 620 storing instructions 622 of the battery metrics linear methods and the dispatch logic and control system (e.g., as shown in FIG. 1) and, optionally, data 624; a field input interface 630; and a field output interface 640. The site-level controller can further include a network interface 650 (e.g., for communicating with other controllers, computing systems, or servers), a power supply 660 (e.g., a battery and/or AC to DC converter) and a programming interface 670 (through which instructions can be loaded onto the storage system). As illustrated, the site-level controller 600 can be embodied as a PLC. Of course, it should be understood that certain implementations of the described system can be implemented via a computer or other type of controller.

The processor 610 processes the signals received via the field input interface 630 (and/or network interface 650) according to the instructions 622 stored at the storage system 620 and outputs control signals via the field output interface 640. Processor 610 can include one or more processors such as, but not limited to, general purpose CPUs, GPUs, FPGAs, application specific processors, and logic devices, as well as any other type of processing device, combinations, or variations thereof. In some cases, operations carried out by the on-site controller are stored as instructions in storage system 620, which can include physical storage devices that are removable and/or built in with the one or more processors.

The field output interface 640 may be coupled to elements such as, but not limited to, battery/storage systems, indicators (e.g., lamps), sirens, electric motors, pneumatic or hydraulic pumps, and magnetic relays.

The storage system 620 can be one or more of any suitable storage media including volatile memory (e.g., random access memory such as DRAM and SRAM) and non-volatile memory (e.g., flash memory, ferroelectric or magnetic random-access memory). As mentioned above, the storage system 620 can include the instructions 622 and data 624, including data associated with battery system data input, catalog data, and utility information. The instructions 622 stored at the storage system 620 can, when executed by the processor 610, direct the site-level controller 600 to perform control of power resources based on battery state of health and operation as described with respect to FIG. 2. In some cases, an operating system can be included as executable instructions stored on the storage system 620.

The field input interface 630 can receive signals from connected devices at a microgrid, including but not limited to buttons, switches (e.g., proximity switches or photoelectric switches that can sense presence of object, limit switches, condition switches to indicate detection of pressure, temperature, etc.), and sensors (e.g., simple sensors such as temperature sensor or pressure sensor, complex sensors such as positioning systems or machine vision systems). Other inputs can be received via the field input interface 630 directly or via the network interface 650, including information from other PLCs or controllers. In some cases, a separate processing system performs processes corresponding to certain battery metrics linear methods used in control of power resources and the outputs of such processes are received via network interface 650 or field input interface 630.

The programming interface 670 can include a serial port or other interface that can couple to a programming device for loading program instructions, such as instructions 622, (and optional data such as catalog data) into the storage system. The controller 600 can be ruggedized, providing tolerance of environmental conditions such as dust, moisture, heat, cold, and radiation.

It should be understood that a storage device or a storage medium of any of the storage systems described herein includes one or more physical devices and excludes propagating signals per se.

Figure 7:
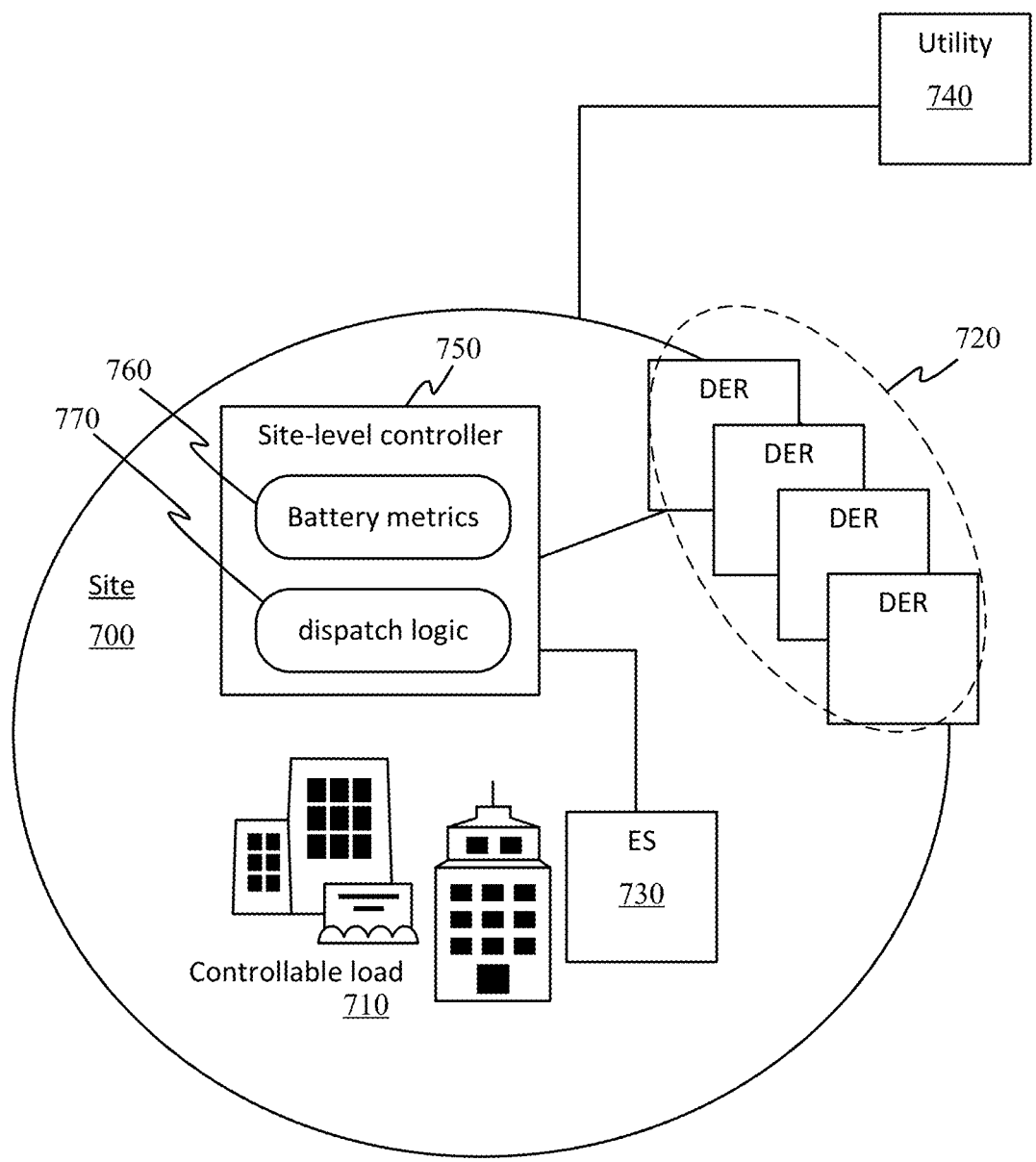
FIG. 7 illustrates an example operating environment of the described system for control of power resources based on battery state of health and operation metrics.

FIG. 7 illustrates an example operating environment of the described system for control of power resources based on battery state of health and operation.

Referring to FIG. 7, a site 700 with a controllable load 710 (e.g., with powered buildings, equipment, etc.) can be on a microgrid utilizing a distributed energy resource (DER) 720, including battery storage such as at an energy storage facility (ES) 730, and power from a utility 740.

A DER 720 generally refers to any resource on a distribution system that produces electricity. DER often include natural gas, wind, solar, distributed generation, biogas plants, other storage resources such as hydrogen fuel cells and electric vehicles, and demand response resources; whereas coal and nuclear energy tend to be considered conventional resources (although it is possible that smaller-scale coal and nuclear energy resources could be part of DER in the future).

An ES 730 includes one or more energy storage devices at a single location on either the utility side or the customer's side of the retail meter. ES can be any of various technology types, including electric vehicle charging stations. The described systems for control of power resources based on battery state of health and operation can be applied to control the use of the energy storage device(s) at an ES.

Microgrid refers to an aggregation of multiple DER types behind the customer meter at a single point of interconnection that has the capability to island. A microgrid may range in size and complexity from a single "smart" building to a university campus or industrial/commercial park.

Site operators, such as facility managers at data centers, can use the described systems, including via site-level controller 750, for control of the power resources based on the battery state of health and operation to achieve certain objectives such as lower operational expenses while still maintaining systems under warranties.

Site-level controller 750 can be embodied as any suitable controller such as described with respect to FIGS. 5 and 6. Site-level controller 750 performs the operations described herein for control of power resources, including battery metrics linear methods 760 and dispatch logic 770, such as described with respect to FIGS. 1, 2, 3A, 3B, and 4A-4D.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of controlling power resources, comprising:
   receiving battery catalog data and battery throughput data;
   estimating a state of health (SoH) of a particular battery of a battery system using an end-of-life state of health value and a kWh warranty value obtained from the battery catalog data and a battery kWh throughput obtained from the battery throughput data;
   estimating battery capacity using the estimated SoH and a rated battery capacity received from the battery catalog data;
   estimating an allowable monthly throughput using a month warranty value and the kWh warranty value obtained from the battery catalog data and the battery kWh throughput and number of operating months obtained from the battery throughput data;
   calculating dynamic discharge cost using battery replacement cost data and the kWh warranty value obtained from the battery catalog data and the battery kWh throughput obtained from the battery throughput data;
   determining an optimal dispatch for operating the particular battery considering battery degradation using the estimated battery capacity, the estimated allowable monthly throughput, and the dynamic discharge cost;
   outputting dispatch commands to the battery system according to the determined optimal dispatch; and
   using the dispatch command to adjust at least one of a penalty cost, a battery kWh throughput, and a state of charge constraint of the battery system.

2. The method of claim 1, wherein estimating the SoH of the particular battery comprises:
   obtaining the end-of-life state of health value (SoH_EoL) and a kWh warranty value ($kWh_{warranty}$) from the battery catalog data;
   obtaining the battery kWh throughput indicating a cumulative sum of energy withdrawn from the battery until a time of estimation of the SoH ($kwh_{cumulative}$) from the battery throughput data; and $$\text{estimating } SoH \text{ as } SoH = \left(1 - \frac{SoH_{EoL} \times kWh_{cumulative}}{kWh_{warranty}}\right).$$

3. The method of claim 1, wherein estimating the battery capacity comprises obtaining the rated battery capacity from the battery catalog data and calculating the battery capacity (storage_max_cap) using the estimated SoH as: storage_max_cap=SoH×Rated battery capacity (kWh).

4. The method of claim 1, wherein estimating the allowable monthly throughput comprises:
   obtaining a manufacturer rated calendar life of the battery ($Month_{warranty}$) and the kWh warranty value indicating a manufacturer warrantied energy throughput of the battery ($kWh_{warranty}$) from the battery catalog data;
   obtaining the battery kWh throughput indicating a cumulative sum of energy withdrawn from the battery until a time of estimation of the SoH, ($kWh_{cummulative}$) from the battery throughput data;
   obtaining a total number of months since battery commissioning ($Month_{cumulative}$); and
   estimating the allowable monthly throughput ($kWh_{allowed}$) as:

$$kWh_{allowed} = \frac{(kWh_{warranty} - kWh_{cumulative})}{(Month_{warranty} - Month_{cumulative})}.$$

5. The method of claim 1, wherein calculating dynamic discharge cost comprises:
   obtaining the kWh warranty value indicating a manufacturer warrantied energy throughput of the battery ($kWh_{warranty}$) from the battery catalog data;
   obtaining battery replacement cost data (battery replacement capital cost);
   obtaining the battery kWh throughput indicating a cumulative sum of energy withdrawn from the battery until a time of estimation of the SoH ($kWh_{cumulative}$) from the battery throughput data; and
   calculating dynamic discharge cost as follows:

$$\text{dynamic discharge cost} = \frac{\text{battery replacement capital cost}}{(kWh_{warranty} - kWh_{cumulative})}.$$

6. The method of claim 1, wherein determining the optimal dispatch for operating the particular battery considering battery degradation using the estimated battery capacity, the estimated allowable monthly throughput, and the dynamic discharge cost comprises:
   calculating a penalty cost;
   applying a battery throughput constraint; and
   applying one or more state of charge constraints.

7. The method of claim 6, wherein calculating the penalty cost comprises:
   receiving utility information of peak hour utility tariff data, utility charge$_{peak}$;
   obtaining the battery throughput data, including cumulative kWh throughput for a particular month (month) and timestamp (t);
   obtaining the estimated allowable monthly throughput for the particular month;

obtaining the calculated dynamic discharge cost; and
calculating the penalty cost as:

$$\text{Penalty cost}_t\left(\frac{\$}{kWh}\right) = $$

$$(\text{utility charge}_{peak} - \text{dynamic discharge cost}) \times \frac{kWh_{cumulative,month,t}}{kWh_{allowed,month}}.$$

8. The method of claim 6, wherein applying the battery throughput constraint comprises:
obtaining the estimated allowable monthly throughput ($kWh_{allowed}$);
obtaining a battery throughput optimization value ($kWh_{optimization}$) available from an optimization or control strategy model; and
applying the battery throughput constraint on the battery throughput optimization value as $kWh_{optimization} \leq kWh_{allowed}$.

9. The method of claim 8, wherein obtaining the battery throughput optimization value comprises calculating the battery throughput optimization value ($kWh_{optimization}$) as $kWh_{optimization} = \Sigma_{over\ timestamps\ t\ in\ a\ month}(\text{storage\_discharge}_t \times 1/\text{granularity})$, where storage_discharge$_t$ is a discharge value captured at timestamp t.

10. The method of claim 6, wherein applying the one or more state of charge constraints comprises applying a monthly average state of charge constraint, applying a high state of charge constraint, or applying both the monthly average state of charge constraint and the high state of charge constraint.

11. The method of claim 10, wherein applying the monthly average state of charge constraint comprises:
obtaining a manufacturer given state of charge ($SOC_{manufacturer}$) from the battery catalog data;
obtaining the estimated battery capacity;
calculating a monthly average state of charge ($SoC_{average}$) by $$SoC_{average} = \frac{\Sigma_{over\ timestamps\ t\ in\ a\ month}(SoC_t)}{\text{no. of timestamps in the month}},$$

where a state of charge is determined using the estimated battery capacity at regular intervals and summed over a month; and
applying the monthly average state of charge constraint as $SoC_{average} \leq SoC_{manufacturer}$.

12. The method of claim 10, wherein applying the high state of charge constraint comprises:
obtaining a manufacturer given high state of charge threshold ($SoC_{thresh}$) and associated length of time from the battery catalog data;
determining an allowed count of timestamps ($n_{SoC,thresh,allowed}$) for which a state of charge of the particular battery is allowed to exceed $SoC_{thresh}$ based on the associated length of time;
identifying a count of timestamps ($n_{SoC,thresh}$) in which the state of charge of the particular battery is above $SoC_{thresh}$; and
applying the high state of charge constraint as $n_{SoC,thresh} \leq n_{SoC,thresh,allowed}$.

13. A power resource control system comprising:
a processor;
a storage system;
instructions for battery metrics linear methods stored on the storage system that direct the power resource control system to:
estimate a state of health (SoH) of a particular battery of a battery system using an end-of-life state of health value and a kWh_warranty value obtained from battery catalog data and a battery kWh throughput obtained from battery throughput data;
estimate battery capacity using the estimated SoH and a rated battery capacity received from the battery catalog data;
estimate an allowable monthly throughput using a month warranty value and the kWh warranty value obtained from the battery catalog data and the battery kWh throughput and number of operating months obtained from the battery throughput data;
calculate dynamic discharge cost using battery replacement cost data and the kWh warranty value obtained from the battery catalog data and the battery kWh throughput obtained from the battery throughput data; and
output the estimated battery capacity, the estimated allowable monthly throughput, and the dynamic discharge cost for determining an optimal dispatch for operating the particular battery; and
use the dispatch command to adjust at least one of a penalty cost, a battery kWh throughput, and a state of charge constraint of the battery system;
dispatch logic that receives the estimated battery capacity, the estimated allowable monthly throughput, and the dynamic discharge cost to determine an optimal dispatch for operating the particular battery considering battery degradation, the power resource control system outputting dispatch commands to the battery system according to the determined optimal dispatch.

14. The power resource control system of claim 13, further comprising:
dispatch logic that receives the estimated battery capacity, the estimated allowable monthly throughput, and the dynamic discharge cost to determine an optimal dispatch for operating the particular battery considering battery degradation, the power resource control system outputting dispatch commands according to the determined optimal dispatch.

15. The power resource control system of claim 14, wherein the dispatch logic determines the optimal dispatch for operating the particular battery considering battery degradation using the estimated battery capacity, the estimated allowable monthly throughput, and the dynamic discharge cost by:
calculating a penalty cost;
applying a battery throughput constraint; and
applying one or more state of charge constraints.

16. The power resource control system of claim 15, wherein the dispatch logic calculates the penalty cost by:
receiving utility information of peak hour utility tariff data, utility charge$_{peak}$;
obtaining the battery throughput data, including cumulative kWh throughput for a particular month (month) and timestamp (t);
obtaining the estimated allowable monthly throughput for the particular month;
obtaining the calculated dynamic discharge cost; and calculating the penalty cost as:

$$\text{Penalty cost}_t\left(\frac{\$}{kWh}\right) = \\ (\text{utility charge}_{peak} - \text{dynamic discharge cost}) \times \frac{kWh_{cumulative,month,t}}{kWh_{allowed,month}}.$$

17. The power resource control system of claim 15, wherein the dispatch logic applies the battery throughput constraint by:
   obtaining the estimated allowable monthly throughput ($kWh_{allowed}$);
   obtaining a battery throughput optimization value ($kWh_{optimization}$) available from an optimization or control strategy model; and
   applying the battery throughput constraint on the battery throughput optimization value as $kWh_{optimization} \leq kWh_{allowed}$.

18. The power resource control system of claim 15, wherein the one or more state of charge constraints comprise a monthly average state of charge constraint, a high state of charge constraint, or both the monthly average state of charge constraint and the high state of charge constraint.

19. The power resource control system of claim 18, wherein the dispatch logic applies the monthly average state of charge constraint by:
   obtaining a manufacturer given state of charge ($SOC_{manufacturer}$) from the battery catalog data;
   obtaining the estimated battery capacity;
   calculating a monthly average state of charge ($SoC_{average}$) by $$SoC_{average} = \frac{\sum_{over\ timestamps\ t\ in\ a\ month}(SoC_t)}{\text{no. of timestamps in the month}},$$

where a state of charge is determined using the estimated battery capacity at regular intervals and summed over a month; and
   applying the monthly average state of charge constraint as $SOC_{average} \leq SoC_{manufacturer}$.

20. The power resource control system of claim 18, wherein the dispatch logic applies the high state of charge constraint by:
   obtaining a manufacturer given high state of charge threshold ($SoC_{thresh}$) and associated length of time from the battery catalog data;
   determining an allowed count of timestamps ($n_{SoC,thresh,allowed}$) for which a state of charge of the particular battery is allowed to exceed $SoC_{thresh}$ based on the associated length of time;
   identifying a count of timestamps ($n_{SoC,thresh}$) in which the state of charge of the particular battery is above $SoC_{thresh}$; and
   applying the high state of charge constraint as $n_{SoC,thresh} \leq n_{SoC,thresh,allowed}$.

\* \* \* \* \*